Aug. 29, 1950 W. VAN DEN BROEK 2,520,747
FLUID CURRENT DRIER FOR GRASS AND THE LIKE
Filed Aug. 12, 1947

Inventor
Wouter van den Broek,
by Robert E. Burns
Attorney

Patented Aug. 29, 1950

2,520,747

UNITED STATES PATENT OFFICE 2,520,747

FLUID CURRENT DRIER FOR GRASS AND THE LIKE

Wouter van den Broek, Driebergen, Netherlands

Application August 12, 1947, Serial No. 768,091
In the Netherlands August 22, 1945

Section 1, Public Law 690, August 8, 1946
Patent expires August 22, 1965

1 Claim. (Cl. 34—57)

The invention relates to a device for the drying of grass, clover and the like and has for its object to make this device particularly suitable for the drying of cut grass, clover and the like of light nature and to so design it that in the longitudinal direction it occupies relatively little space and in particular is much more compact than the known grass drying devices including a horizontal drying drum and a preceding tube-drier.

In order to attain the purpose referred to above the device according to the invention comprises as an air separator a cyclone known in itself, which, however, in this case does not serve as an air separator only but also as a drier. If the product to be dried, after having left a disintegrating machine, e. g. a grass-cutting machine and having been brought together with the hot drying air, would be supplied through a connecting conduit of the shortest possible length between this meeting point and the cyclone mounted closely adjacent thereof directly to the cyclone, then the drying process due to the short conveying path would be far from sufficient. It would be possible to mount the cyclone at a larger distance from the meeting point referred to above, but then this would give rise to the drawback of a drying device occupying much space in the longitudinal direction, which drawback the invention has for its object to avoid.

The invention consists in this that the desired extension of the drying path is obtained in a simple and practical way by reason of the fact that the supply conduit of the grass and the drying air to the inlet of the cyclone is wound around the cyclone one or more times. The number of preferably helical windings around the cyclone will depend on the drying time required and the nature and the moisture contents of the product to be dried.

The advantage of this construction is not only that the extension of the drying path does not require an extension of the device itself, since the extension of the drying path is obtained in vertical direction by means of one or more successive windings around the cyclone, but also that it enables to utilise the already available wall of the cyclone as the inner wall of the surrounding tube windings, which gives a considerable saving of material; an outer wall is then necessary only, which may be heat-insulating, and a radial separation between the windings.

Preferably according to the invention within the tube windings partitions are arranged in such a manner that the product to be dried is compelled to follow a zig-zag shaped path in the conveying direction, whereby an intimate mixing of the drying air and the product is obtained. Preferably the partitions—considered in vertical direction—extend to a point at some distance from the bottom of the windings, whereby the formation of dead corners is avoided, wherein the product to be dried may accumulate. It will thus be seen that there will always be an open passage for the product at the bottom of the partitions. The heaviest parts of the product to be dried will be thrown against the partitions for the longest time. When the drying process has proceeded sufficiently far and consequently the weight of the product has been reduced correspondingly, the product will be carried along with the air flow through between the partitions, which when the device is properly designed, will take place in the vicinity of the inlet of the cyclone.

In the drawing which illustrates the invention by way of example,

Figure 1:
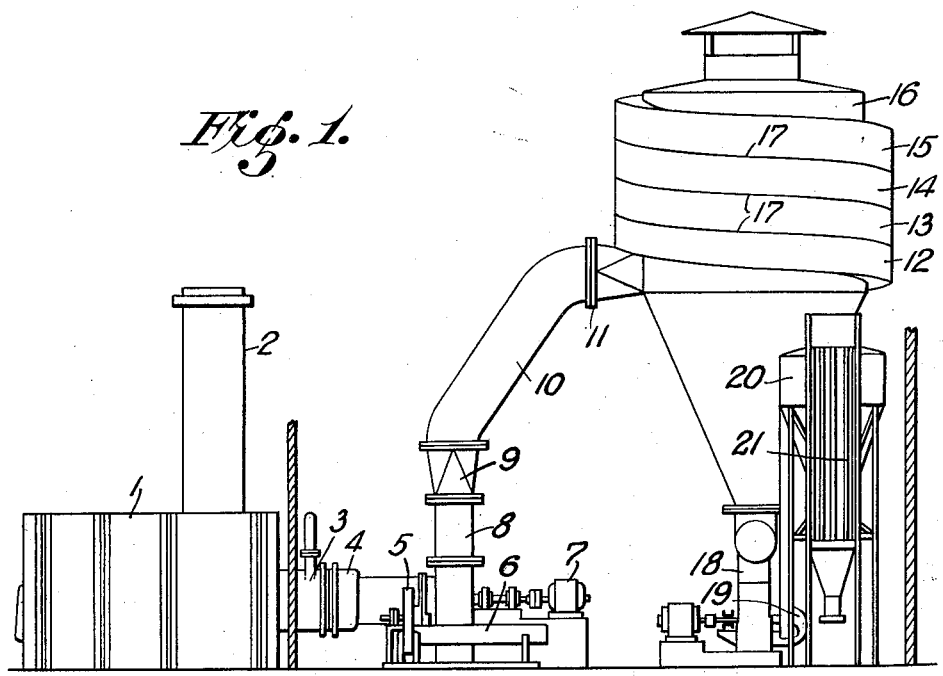
Fig. 1 is a side elevation of a grass drying plant including a drying device according to the invention.

According to Fig. 1 the plant includes a coke oven 1 with a chimney 2 for the heating of the drying air, e. g. to a temperature of about 700° C. The hot air space at 3 is connected to a tube 4 to which at 5 a grass cutting machine 6 is connected. The cut grass together with the drying air is blown by a fan 7 into a vertical tube 8, which is enlarged at 9 and merges into an upwardly inclined tube 10; the further conveying path for cut grass and drying air connected thereto at 11 here is formed by four windings 13, 14, 15 and 16, helically wound around the cyclone 12. The inner wall of said windings is formed by the lateral wall of the cyclone.

However, it would also be possible to keep the windings free from the cyclone, i. e. with their own inner wall located against the outer wall of the cyclone.

In radial direction the windings are separated from one another by walls 17. The outer wall will be made heat insulating. From the cyclone the dry grass is passed to a hammer-mill 18 with corresponding exhauster 19 and from here to a cyclone 20 below which the ground grass is received in bags while the air escapes through a dust filter 21.

Figure 2:
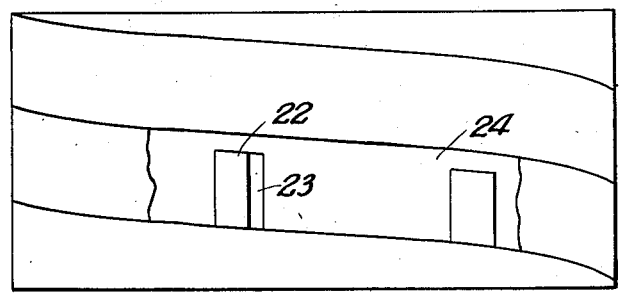
Figs. 2 and 3 show on a larger scale an arrangement of partitions in a winding around the cyclone.
Figure 3:
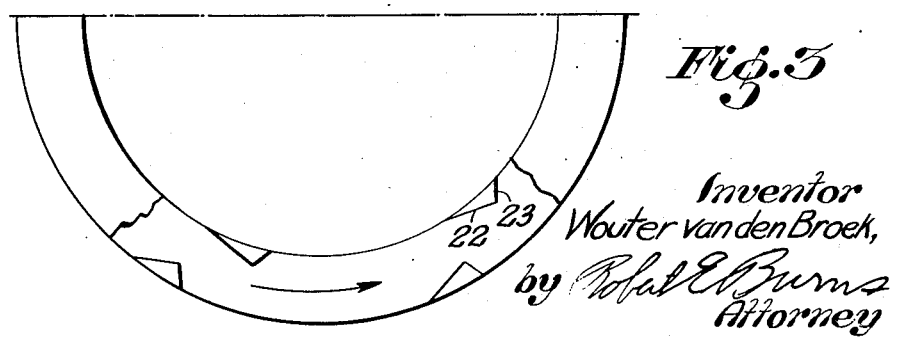

Figs. 2 and 3 show how in the windings surrounding the cyclone, partitions 22, 23 are arranged, alternately at the one and the opposite upstanding wall of the helical conveying conduit.

These partitions (22, 23), shown in parallel pairs, form wedge shaped members projecting from the path of the grass and the drying air. Against the long partitions 22 the heaviest parts of the product will be thrown for the longest time; then they fall down there along and by reason of the fact that the partitions end at some distance from the bottom of the windings they will be further carried along by the drying air in the conveying direction to the cyclone. The distance between the lower edge of the partitions and the bottom of the conduit in Fig. 2 is denoted by 24.

The invention is not limited to a predetermined number of windings; a helical configuration thereof around the cyclone is practical but not necessary. The conveying path around the cyclone might comprise horizontal rings merging into one another by vertical connections. In principle, an extension of the drying path according to the invention will be obtained, thereby without making the plant undesirably long, while at the same time the cyclone will be utilised in a similar manner as in Fig. 1 of the drawings.

I claim:

A device for the drying of grass, clover and the like comprising a cyclone and a conduit for conveying the material to be dried and the drying air to the cyclone, at least part of said conduit being wound about the cyclone in helical windings, said conduit being provided with wedge-shaped partitions extending inwardly from the side walls thereof, said partitions being arranged in pairs extending alternately from the opposed side walls of said conduit, and said partitions extending along only a portion of the height of said side walls, whereby materials passing through the conduit are forced to follow a tortuous path and particles driven toward the outer side wall by centrifugal force are deflected inwardly into the drying air stream.

WOUTER VAN DEN BROEK.

REFERENCES CITED

The following references are of record in the file of this patent:

UNITED STATES PATENTS

| Number | Name | Date |
|---|---|---|
| 1,392,656 | Rew | Oct. 4, 1921 |
| 1,871,773 | Bennett | Aug. 16, 1932 |
| 2,315,084 | Chesler | Mar. 30, 1943 |
| 2,394,605 | Friedman | Feb. 12, 1946 |

FOREIGN PATENTS

| Number | Country | Date |
|---|---|---|
| 436,388 | Great Britain | Oct. 10, 1935 |
| 881,517 | France | Jan. 28, 1943 |